United States Patent
Shukla et al.

(10) Patent No.: US 12,129,352 B2
(45) Date of Patent: Oct. 29, 2024

(54) SYNTACTIC FOAMS WITH ENHANCED RESISTANCE TO SWELLING AND CORROSION

(71) Applicant: Halliburton Energy Services, Inc., Houston, TX (US)

(72) Inventors: Shashwat Shukla, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 195 days.

(21) Appl. No.: 17/537,942

(22) Filed: Nov. 30, 2021

(65) Prior Publication Data

US 2023/0167263 A1 Jun. 1, 2023

(51) Int. Cl.
| | | |
|---|---|---|
| C08J 9/32 | (2006.01) | |
| C08K 3/04 | (2006.01) | |
| C08K 3/34 | (2006.01) | |
| C08K 7/24 | (2006.01) | |
| E21B 47/017 | (2012.01) | |

(52) U.S. Cl.
CPC ............... *C08J 9/32* (2013.01); *C08K 3/041* (2017.05); *C08K 3/042* (2017.05); *C08K 3/346* (2013.01); *C08K 7/24* (2013.01); *E21B 47/017* (2020.05); *C08J 2300/00* (2013.01); *C08K 2201/003* (2013.01); *C08K 2201/005* (2013.01); *C08K 2201/011* (2013.01)

(58) Field of Classification Search
CPC ........ C08J 9/32; C08J 9/0066; C08J 2300/00; C08K 3/041; C08K 3/042; C08K 7/24; C08K 3/346; C08K 2201/011; C08K 2201/005; C08K 2201/003; C08K 7/28
USPC .......................................................... 523/218
See application file for complete search history.

(56) References Cited

U.S. PATENT DOCUMENTS

| | | | |
|---|---|---|---|
| 4,415,512 A | | 11/1983 | Torobin |
| 4,568,389 A | * | 2/1986 | Torobin ............ B22F 1/08 75/229 |
| 4,582,534 A | * | 4/1986 | Torobin ............ H01F 1/1535 75/229 |
| 8,815,408 B1 | | 8/2014 | Cochran et al. |
| 9,926,777 B2 | | 3/2018 | Rodgers et al. |
| 2005/0011645 A1 | | 1/2005 | Aronstam et al. |
| 2011/0077176 A1 | | 3/2011 | Smith et al. |
| 2014/0345875 A1 | | 11/2014 | Murphree et al. |
| 2017/0015550 A1 | * | 1/2017 | Martin ............ C01B 3/0084 |
| 2018/0138589 A1 | * | 5/2018 | Clegg ............ H05K 1/032 |

FOREIGN PATENT DOCUMENTS

| | | |
|---|---|---|
| CA | 2928584 | 5/2015 |
| EP | 2242795 B1 | 7/2016 |
| WO | 9957182 | 11/1999 |
| WO | 2009085191 | 7/2009 |
| WO | 2009143300 | 8/2010 |
| WO | 2014189766 A2 | 11/2014 |

OTHER PUBLICATIONS

Afolabia et al., "Syntactic Foams Formulations, Production Techniques, and Industry Applications: A Review", Journal of Materials Research and Technology, vol. 9, No. 5, Sep.-Oct. 2020, pp. 10698-10718.

Ali, "Syntactic Foam Materials For Resident ROV Applications", ROV Planet, Issue Q4, available at https://www.rovplanet.com/tportal_upload/md_publications/rovplanet_25.pdf, 2020, pp. 59-62.

Barinov et al., "Stress-Corrosion Cracking in Alumina Ceramics", Key Engineering Materials, vol. 223, Feb. 2002, pp. 187-192.

Businesswire, "Global Thermoplastic Composites Market (2020 to 2027)—by Fiber Type, Resin Type, Product Type and Applications—ResearchAndMarkets.com", available at https://www.businesswire.com/news/home/20210615005921/en/Global-Thermoplastic-Composites-Market-2020-to-2027---by-Fiber-Type-Resin-Type-Product-Type-and-Applications---ResearchAndMarkets.com, Jun. 15, 2021, 2 pages.

Cheng et al., "Ductile Zr-Based BulkMetallic Glasses by Controlling Heterogeneous Microstructure from Phase Competition Strategy", Nanomaterials, vol. 9, No. 12, Dec. 2019, pp. 1-7.

Choqueuse et al., "Durability of Composite Materials for Underwater Applications", Solid Mechanics and its Applications, vol. 208, Nov. 2014, pp. 195-207.

Dando et al., "The Effect of Nano-additive Reinforcements on Thermoplastic Microballoon Epoxy Syntactic Foam Mechanical Properties", Journal of Composite Materials, vol. 52, No. 7, Jun. 21, 2017, pp. 1-10.

Glassimetal Technology, https://www.glassimetal.com, 2017, 4 pages.

Gludovatz et al., "Exceptional Damage-Tolerance of a Mediumentropy Alloy CrCoNi at Cryogenic Temperatures", Nature Communications, vol. 7, Feb. 2, 2016, pp. 1-8.

Guloglu et al., "Moisture Absorption of Carbon/Epoxy Nanocomposites", Journal of Composites Science, vol. 4, No. 1, Feb. 2020, pp. 1-14.

Heraeus, "Amorphous Materials", available at https://www.heraeus.com/en/group/products_and_solutions_group/amorphous_metals/about_amorphous_metals/about_amorphous_metals.html at least as early as Aug. 23, 2021, 3 pages.

Ito et al., "Dynamic Fatigue of Sodium-Silicate Glasses with High Water Content", Journal de Physique Colloques, vol. 43, Available online at https://hal.archives-ouvertes.fr/jpa-00222428/document, 1982, pp. C9-611-C9-614.

Jacobson et al., "Oxidation and Corrosion of Non-Oxide Creamics", Reference Module in Materials Science and Materials Engineering, Dec. 2016, 34 pages.

(Continued)

*Primary Examiner* — Hannah J Pak
(74) *Attorney, Agent, or Firm* — Kilpatrick Townsend & Stockton LLP

(57) ABSTRACT

A syntactic foam including a matrix material and a filler material. The filler material may include microspheres of metallic glass material, the microspheres may be hollow microspheres.

10 Claims, 5 Drawing Sheets

(56) References Cited

OTHER PUBLICATIONS

Jayalakshmi et al., "Hydrogen Embrittlement in Metallic Amorphous Alloys: An Overview", Journal of ASTM International, vol. 7, No. 3, Mar. 2010, pp. 1-24.

Kawashima et al., "A Ni- and Cu-free Zr-based Bulk Metallic Glass with Excellent Resistance to Stress Corrosion Cracking in Simulated Body Fluids", Materials Science and Engineering A, vol. 542, Apr. 2012, pp. 140-146.

Kendall et al., "Metal Shell Technology Based Upon Hollow Jet Instability", Journal of Vacuum Science & Technology, vol. 20, No. 4, Apr. 1982, 4 pages.

Krainess et al., "Strength of a Dense Alumina Ceramic after Aging in Vitro", Journal of Biomedical Materials Research, vol. 12, No. 2, Mar. 1978, pp. 241-246.

Lee et al., "Investigation of Metallic and Metallic Glass Hollow Spheres For Fusion Target Application", MRS Online Proceedings Library, vol. 9, 1982, pp. 105-113.

Poveda et al., "Carbon Nanofiber Reinforced Syntactic Foams: Degradation Mechanism for Long Term Moisture Exposure and Residual Compressive Properties", Polymer Degradation and Stability, vol. 98, No. 10, Oct. 2013, pp. 2041-2053.

Salleh et al., "Effects of Water Absorption on Mechanical Properties of Glass Microballoons/Vinyl Ester Syntactic Foams", Research and Reviews in Materials Science and Chemistry, vol. 8, No. 1, Available online at https://jyotiacademicpress.net/effects_of_water_absorption_on.pdf, Jun. 18, 2018, pp. 59-119.

Shi et al., "Stress Corrosion Cracking and Hydrogen-Induced Cracking of an Alumina Ceramic", Journal of the American Ceramic Society, vol. 88, No. 2, Feb. 2005, pp. 353-356.

Shukla et al., "Evidence of Anti Free Volume Creation During Deformation Induced Nanocrystallization of Nd—Fe-b Metallic Glass", Physica Status Solidi (RRL), vol. 5, Nos. 5-6, Apr. 11, 2011, pp. 169-171.

Shukla et al., "Nanocrystallization in Driven Amorphous Materials", Acta Materialia, vol. 61, No. 9, May 2013, pp. 3242-3248.

Smith et al., "Modelling Hollow Thermoplastic Syntactic Foams under High-strain Compressive Loading", Composites Science and Technology, vol. 213, Mar. 10, 2021, pp. 1-31.

Telford, "The Case for Bulk Metallic Glass", Materialstoday, vol. 7, No. 3, Mar. 2004, pp. 36-43.

Wei et al., "The Influence of Stresses on Ageing Kinetics of 3Y- and 4Y-Stabilized Zirconia", Journal of the European Ceramic Society, vol. 38, No. 2, Feb. 2018, 17 pages.

Wiederhorn et al., "Moisture Assisted Crack Growth in Ceramics", The International Journal of Fracture Mechanics, vol. 4, No. 2, Jun. 1968, pp. 171-177.

Wiederhorn et al., "Stress Corrosion and Static Fatigue of Glass", Journal of The American Ceramic Society, vol. 53, No. 10, Oct. 1970, pp. 543-548.

Zhao et al., "Low Temperature Degradation of Aluminatoughened Zirconia in Artificial Saliva", Journal of Wuhan University of Technology Materials Science Edition, vol. 28, No. 4, Aug. 2013, pp. 844-848.

International Application, International Search Report and Written Opinion, PCT/US2021/061124, Aug. 23, 2022, 11 pages.

* cited by examiner

| Figures of Merit for Low Density Syntactic Foams | Material Options for Foam Reinforcement | | | Material Options for Foam Matrix | |
|---|---|---|---|---|---|
| | Oxide Glass (Commercial) | Ceramic (Lab-Scale) | Metallic Glass (Proposed) | Polymer (Commercial) | Polymer-Carbon Nanocomposite (Proposed) |
| Yield Strength | High | High | Excellent | Low | Moderate |
| Toughness | Low | Low | Excellent | Low | Moderate |
| Elastic Strain Limit | Low | Low | Excellent | High | High |
| Swelling Resistance | Low | High | Excellent | Low | High |
| Resistance to Aging and Chemical Degradation | Low | Moderate | Excellent | High | High |

FIG. 5

SYNTACTIC FOAMS WITH ENHANCED RESISTANCE TO SWELLING AND CORROSION

TECHNICAL FIELD

The present disclosure relates generally to a syntactic foam with enhanced strength and resistance to swelling and corrosion, and, more particularly (although not necessarily exclusively), to a syntactic foam with enhanced strength and resistance to swelling and corrosion for use in a wellbore.

BACKGROUND

Syntactic foams are composite materials which may be synthesized by embedding a filler material into a matrix material. One example of a filler material can be hollow spheres. The hollow spheres can comprise a glass material or a ceramic material. Syntactic foams may be used as lightweight alternatives to metals, PVCs, and conventional composites in applications in a variety of fields including but not limited to automotive, aviation, and energy industries, where standard materials may not offer the desired chemical compatibility, density, strength, or thermal properties. For example, in energy drilling operations, a syntactic foam may be used to provide thermal insulation or impact protection for flowable downhole tools.

BRIEF DESCRIPTION OF THE DRAWINGS

FIG. 5 is a table identifying characteristics of materials that may be used in syntactic foams.

DETAILED DESCRIPTION

Figure 1:
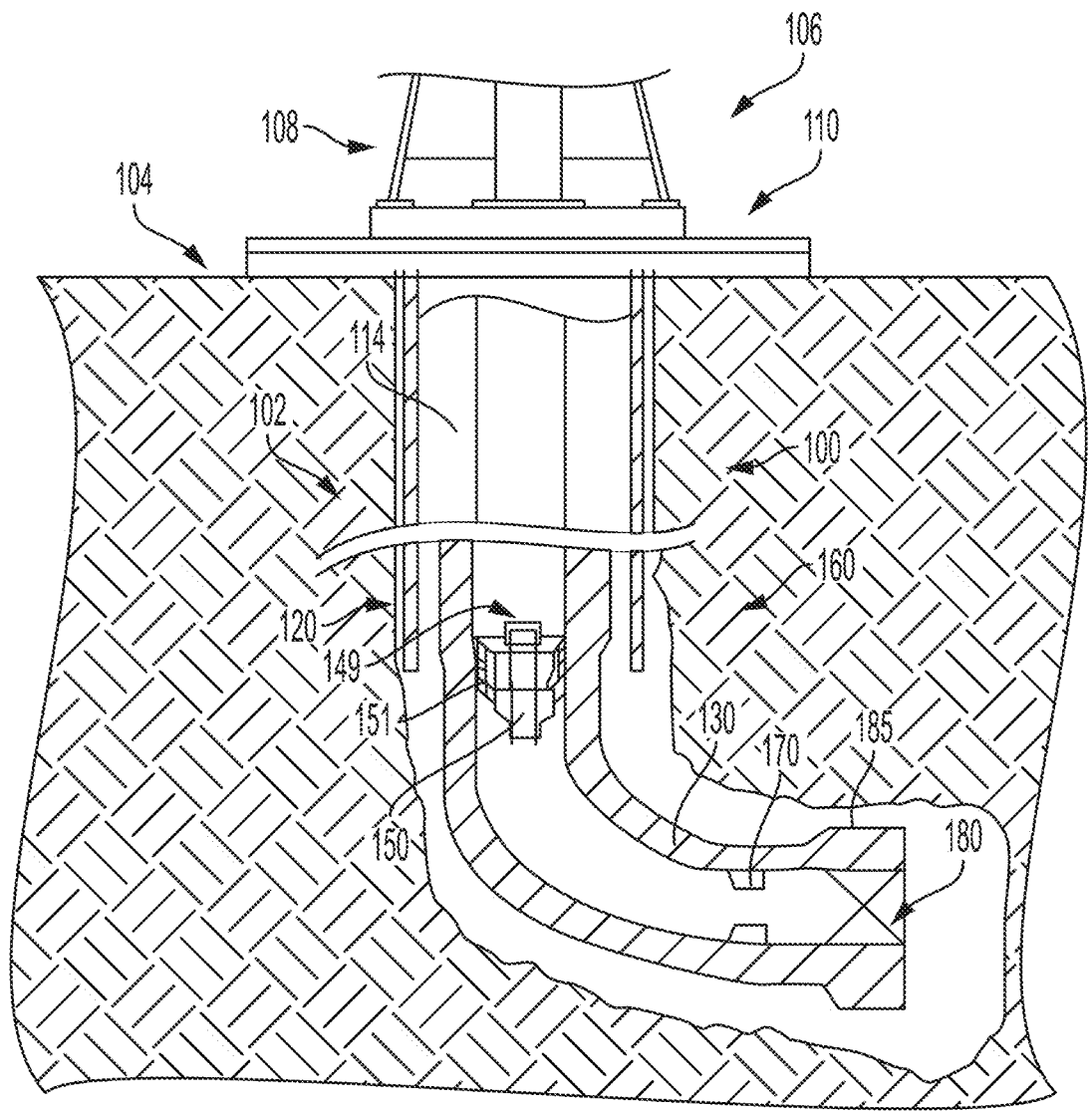
FIG. 1 is a contextual diagram of a wellbore servicing operation according to one example of the present disclosure.

Certain aspects and examples of the present disclosure relate to syntactic foams that are a composite material which may be synthesized by embedding a filler material into a matrix material. In some aspects of the present disclosure, the matrix material of the syntactic foam may be a polymer material. According to aspects of the present disclosure, the filler material may be microspheres of material, in particular hollow microspheres. According to aspects of the present disclosure, the filler material may be microspheres made of a metallic glass material (hereinafter "metallic glass microspheres") for enhancing the syntactic foam's strength and resistance to swelling and corrosion. In some aspects, the metallic glass microspheres may be hollow microspheres made of a metallic glass (hereinafter "hollow metallic glass microspheres"). In some aspects, the microspheres may be solid microspheres made of a metallic glass (hereinafter "solid metallic glass microspheres") which may provide a higher strength syntactic foam at a greater weight than the syntactic foam provided with hollow microspheres. For example, syntactic foams according to aspects of the present disclosure may experience reduced swelling and corrosion when exposed to fluids, chemicals, and/or extreme heat or pressure. In some aspects of the present disclosure, the polymer matrix may be augmented to include carbon nanofibers, nanotubes, graphene-based materials, or nano-clay.

According to aspects of the present disclosure, syntactic foams made with metallic glass microspheres may exhibit high compressive strength, which may allow the syntactic foams to maintain their structural integrity under heavy loading and high hydrostatic pressure. Syntactic foams made with metallic glass microspheres, according to aspects of the present disclosure, may also benefit from increased toughness, and high elastic strain limit values. Additionally or alternatively, such syntactic foams may have a high resistance to swelling and corrosion, including stress corrosion cracking and may also have highly tunable phase fractions, microstructures, chemical compositions, and morphological properties. The metallic glass microspheres used in syntactic foams according to aspects of the present disclosure may have an amorphous or nanocrystalline structure. The amorphous microspheres may not have any defects associated with polycrystalline materials (e.g., dislocations, stacking faults, grain bounders, etc.) and may also increase the strength of the syntactic foam.

According to aspects of the present disclosure, the metallic glass of the metallic glass microspheres may be made of metals such as zirconium, cobalt, aluminum, silver, niobium, titanium, beryllium, nickel, copper, or yttrium, or a combination of those metals. In accordance with one non-limiting example, the major element present in the metallic glass microspheres may be zirconium. In accordance with another non-limiting example, the metallic glass microspheres may be made of zirconium, aluminum, and cobalt, with zirconium being the major element. In another non-limiting example, the metallic glass microspheres may be based on a nickel-niobium compound and may include other alloying additions. The composition of the metallic glass microspheres based on a nickel-niobium compound may be optimized to resist hydrogen embrittlement and hydrogen-induced cracking. In some non-limiting examples, the matrix material may include one or more of the following: polyurethane, polyamide, epoxy resin, phenolic resin, cyanate ester, polyester, vinyl ester, polyethylene, polypropylene, polystyrene, nylon, and high density polyethylene. In the aspects introduced above and below, the metallic glass microspheres may be hollow metallic glass microspheres or solid metallic glass microspheres.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional diagram of a wellbore system 100 that may include a syntactic foam 150 according to certain aspects and features of the present disclosure. As depicted in FIG. 1, the wellbore system 100 may include a wellbore 114, which may be drilled into a subterranean formation 102 beneath the earth's surface 104. Some examples may make use of a drilling or servicing rig 106 that can include a derrick 108 with a rig floor 110. The wellbore 114 may be cased with a first casing string 120. A plugging flowable component 149 may be positioned downhole. In some examples, the plugging flowable component 149 may be a wiper plug. The plugging flowable component 149 may include a body portion that includes the syntactic foam 150 according to aspects of the present disclosure, and a wiper portion 151 that may be coupled to the body portion that includes a syntactic foam 150 and may also be configured to sealingly couple to a second casing string 130 and form a barrier between a cementitious slurry and a wellbore servicing fluid. The syntactic foam 150 may provide the body portion of the plugging flowable component 149 increased strength and resistance to corrosion and swelling, and may also be configured to provide the plugging flowable component 149 with a buoyancy that can depend on the amount of syntactic foam 150 in the body portion of the plugging flowable component 149. The plugging flowable component 149 may be flowed downward into the wellbore until it reaches a cementing assembly 160. The cementing assembly 160 may include a collar 170, a valve 180, a shoe 185, or any combination thereof. The wiper portion 151 of the plugging flowable component 149 may be sealingly coupled with the second casing string 130, and may prevent cementitious slurry from mixing with drilling fluids or other fluids which may have been introduced to the wellbore. Though shown in FIG. 1 in the context of a downhole environment, syntactic foam 150 according to aspects of the present disclosure may be used in a variety of contexts and industries, including without limitation, aerospace industries, the automotive industries, subsea industries, and the oil and gas industry.

Figure 2:
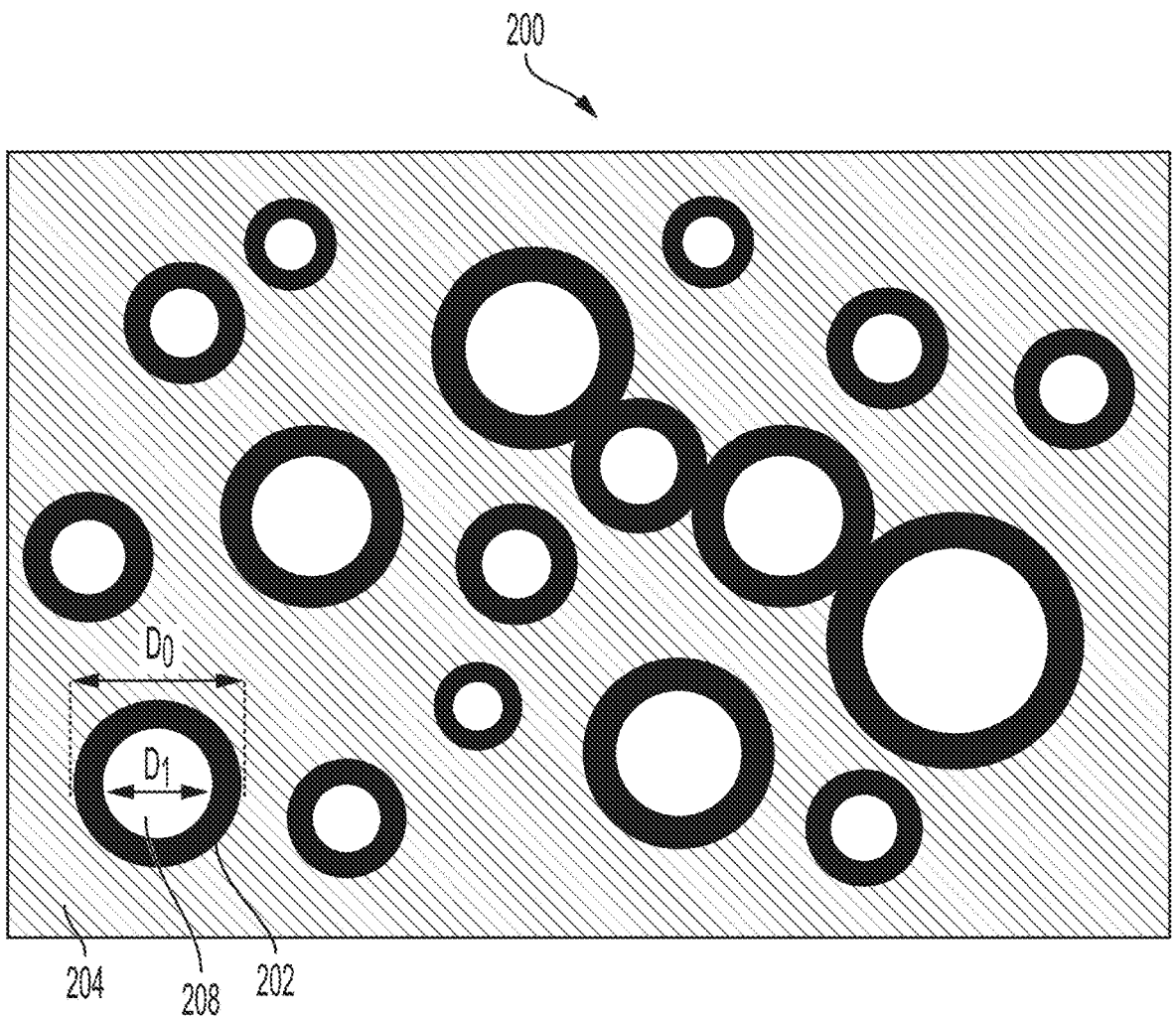
FIG. 2 is a cross-sectional schematic depiction of a syntactic foam that includes hollow metallic glass microspheres embedded in a matrix according to aspects of the present disclosure.

FIG. 2 is a cross-sectional schematic depiction of a syntactic foam 200 that includes a filler material comprising hollow metallic glass microspheres 202 embedded in a matrix material 204 according to one example of the present disclosure. The hollow metallic glass microspheres 202 may have an outer diameter Do and an inner diameter Di defined by the metallic glass material forming a shell of the hollow microsphere 202 that defines an internal hollow cavity 208. In some examples, the matrix material 204 may be made of a polymer material, a ceramic material, or a metal material. In some aspects, a metal or alloy may be used as the material of the matrix material 204 which may improve the tensile properties and high-temperature performance of the syntactic foam 200. In aspects in which the material of the matrix material 204 is a polymer based material, the polymer composition may be selected such that it has a high strength and low absorption. In such aspects, the polymer material may include polyurethane, polyamide, epoxy resin, phenolic resin, cyanate ester, polyester, vinyl ester, polyethylene, polypropylene, polystyrene, nylon, high density polyethylene, or any combination thereof. The hollow metallic glass microspheres 202 may be uniformly dispersed in the matrix material 204, though in some aspects the hollow metallic glass microspheres 202 may not be uniformly dispersed. The hollow metallic glass microspheres 202 may include one or more of: zirconium, cobalt, aluminum, silver, niobium, titanium, beryllium, nickel, copper, or yttrium. The metallic glass that forms the hollow metallic glass microspheres 202 may have a non-crystalline structure (as shown in FIG. 3B) that is disordered, with the atoms occupying more-or-less random positions in the structure, which may prevent crystalline defects, such as dislocations, from governing the mechanical behavior or the syntactic foam 200. The hollow metallic glass microspheres 202 may have a high glass transition temperature. The hollow metallic glass microspheres 202 may have a large plastic zone size. In some aspects, the size of the hollow metallic glass microspheres 202 may be smaller than a corresponding plastic zone size. In some aspects, the hollow metallic glass microspheres 202 may be produced by gas atomization, wherein a hydrodynamic instability of an annular jet of molten alloy forms hollow metallic glass shells defining the hollow metallic glass microspheres 202. In some non-limiting examples, the major element of the hollow metallic glass microspheres 202 may be zirconium. In some non-limiting examples, the hollow metallic glass microspheres 202 may have a composition optimized for a high compressive strength, for example, 1500 MPa or greater, and may also have a high elastic strain limit, for example, 1.5% or greater.

In some non-limiting examples the hollow metallic glass spheres 202 may include a combination of zirconium, aluminum, and cobalt for enhanced resistance to corrosion, including stress-corrosion cracking. In a further non-limiting example, the hollow metallic glass microspheres 202 may be comprise nickel and chromium. In such examples where the hollow metallic glass microspheres 202 comprise nickel and chromium, the hollow metallic glass microspheres 202 may further include additional alloying additions and the composition of the hollow metallic glass microspheres 202 may be optimized for high strength, high toughness, and corrosion resistance in aqueous media, including but not limited to strong acids. In a further non-limiting example, the hollow metallic glass microspheres 202 may include nickel and niobium. In such examples where the hollow metallic glass microspheres 202 include nickel and niobium, the hollow metallic glass microspheres 202 may further include additional alloys and the composition of the hollow metallic glass microspheres 202 may be optimized to provide for high resistance to hydrogen embrittlement and hydrogen-induced cracking.

In some non-limiting examples, the matrix material 204 may reduce an ingress of water, which can reduce a physical degradation of the hollow metallic glass microspheres 202 and a formation of flakes. In some non-limiting examples, the hollow metallic glass microspheres 202 may have an improved resistance to corrosion and may be better able to maintain their structural integrity after long exposure to water or brine as compared to syntactic foams that include a filler material made of oxide glass, which may be more likely to absorb water and corrode, or syntactic foams that include a filler material made of a ceramic, which may weaken upon exposure to water or other liquids.

In further non-limiting examples, the hollow metallic glass microspheres 202 may have an outer diameter (Do) between about 1 and about 300 microns, which may improve fracture toughness and reduce likelihood of stress-induced softening and brittle failure modes. In further non-limiting examples, the hollow metallic glass microspheres 202 may have a glass transition temperature of about 400 degrees Celsius or greater. The hollow metallic glass microspheres 202 may also have a ratio of an inner diameter Di (i.e. the diameter of the inner hollow region) to an outer diameter Do (i.e. the diameter of the entire microsphere) greater than 0.85.

According to aspects of the present disclosure, the syntactic foam 200 may have an elasticity comparable to polymer-based materials, which may make the syntactic foam 200 capable of absorbing large amounts of elastic strain energy under a load without breaking. The hollow metallic glass microspheres 202 may allow the syntactic foam 200 to have a high compressive strength, an improved tensile strength, a low stiffness, a high yield strength, or any combination thereof. The syntactic foam 150 depicted in FIG. 1 may have the characteristics described above with respect to the syntactic foam 200. In some aspects, a syntactic foam, such as syntactic foam 200 may instead have a filler material made of solid metallic glass microspheres. In some aspects, the matrix material 204 may be a metallic or metallic glass polymer matrix.

Figure 3A:
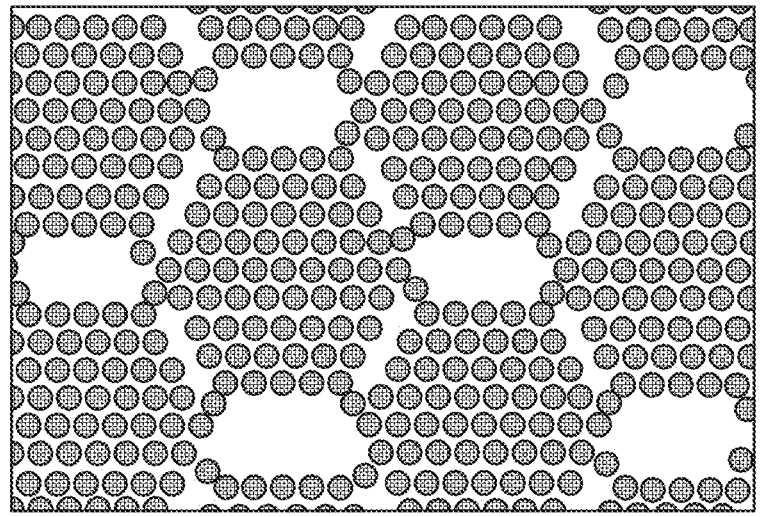
FIG. 3A and FIG. 3B are schematic representations of crystalline metal structures and metallic glass structures, respectively.
Figure 3B:
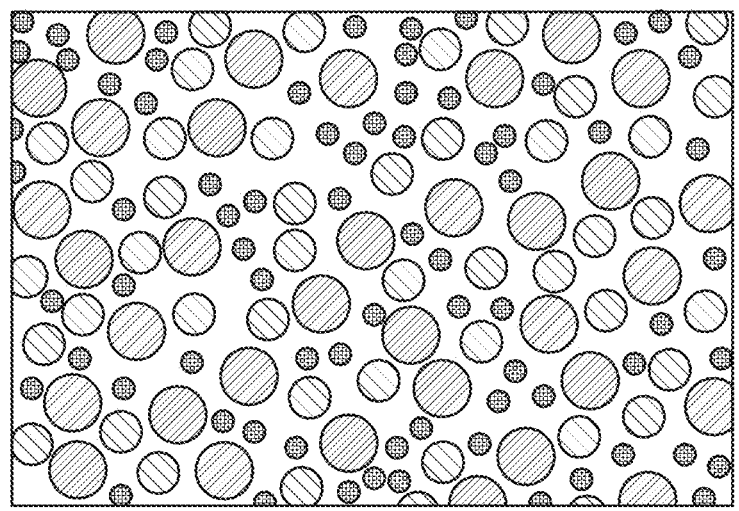

FIG. 3A is a schematic representation of crystalline metal structures and FIG. 3B is a schematic representation of metallic glass structures (FIG. 3B), respectively. The metallic glass that forms the hollow metallic glass microspheres 202 may have a non-crystalline structure as shown in FIG. 3B. The structure of the crystalline metal (shown in FIG. 3A) can be prone to defects and grain boundaries, which can adversely impact its corrosion resistance. The structure of the metallic glass (shown in FIG. 3B) can be amorphous and free of grain boundaries and defects, which can make the metallic glass, and thereby the hollow metallic glass microspheres, resistant to corrosion. According to aspects of the present disclosure, hollow metallic glass microspheres 202 having a metallic glass structure as shown in FIG. 3B may be stronger than hollow microspheres comprising materials having a crystalline structure.

Figure 4:
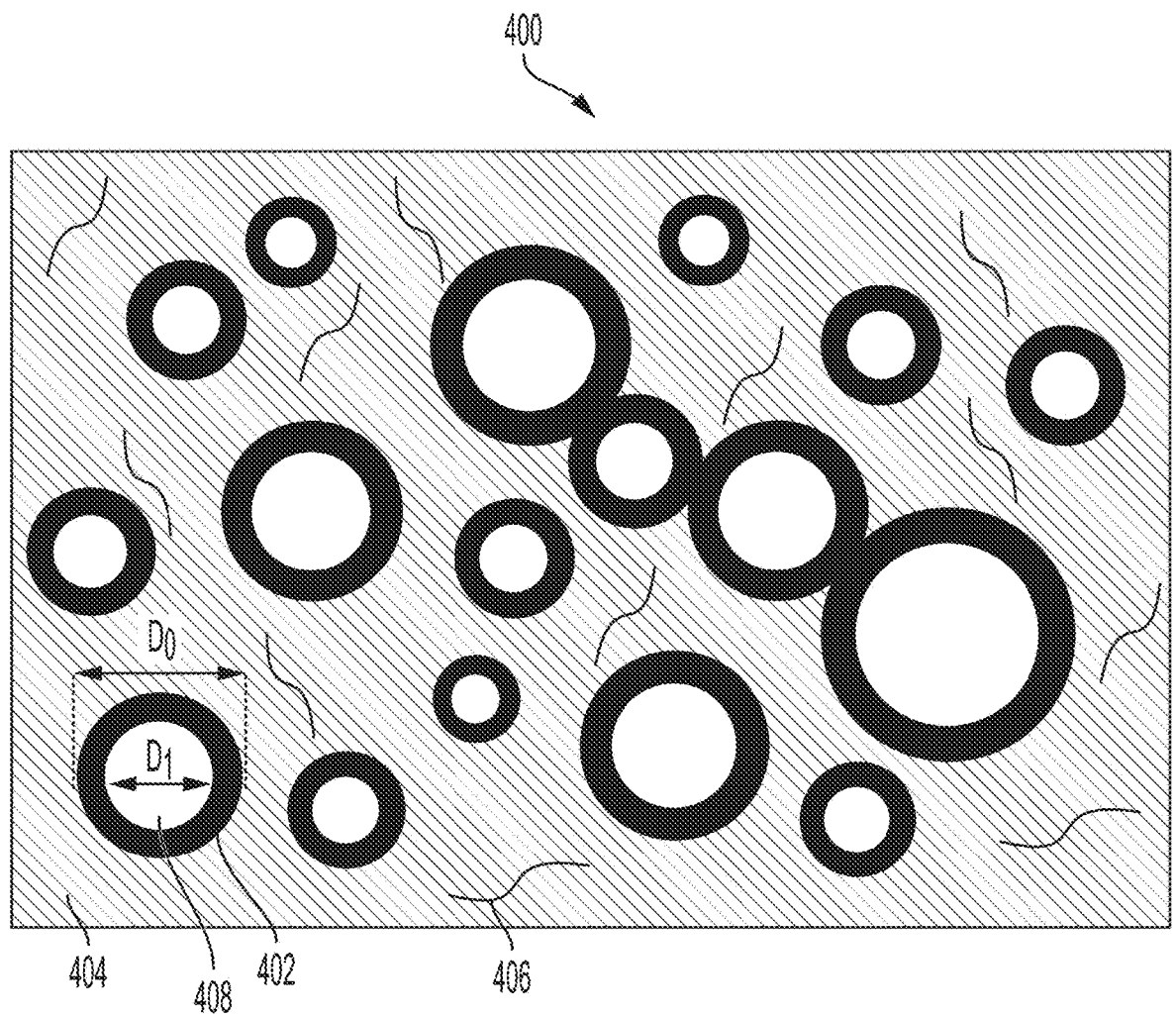
FIG. 4 is a cross-sectional view of a syntactic foam that includes hollow metallic glass microspheres and carbon nanotubes embedded in a polymer matrix according to aspects of the present disclosure.

FIG. 4 is a cross-sectional depiction of a syntactic foam 400 that includes a filler material that is hollow metallic glass microspheres 402 embedded in a matrix material 404 that includes a nano-additive 406. In some aspects, the nano-additive 406 may include carbon nanofibers, nano-clay or graphene-based materials, or a combination thereof. The nano-additive 406 may suppress diffusion and reduce water ingress into the syntactic foam 400. The nano-additive 406 may also reinforce the matrix material 404, thereby increasing the compressive strength and tensile strength of the syntactic foam 400. The hollow metallic glass microspheres 402 may each have an outer diameter Do and an inner diameter Di that can define an internal hollow cavity 408. In some aspects, a syntactic foam, such as syntactic foam 400 may instead have a filler martial made of solid metallic glass microspheres. In some aspects, the matrix material 404 may be a metallic or metallic glass polymer matrix.

FIG. 5 is a table identifying characteristics of materials that may be used in syntactic foams according to aspects of the present disclosure. The table includes a qualitative ranking of five materials: oxide glass, ceramic, metallic glass, polymer, and a polymer-carbon nanocomposite. The five materials are ranked in five different categories: yield strength, toughness, elastic strain limit, swelling resistance, and resistance to aging and chemical degradation. The metallic glass which may be used for the hollow metallic glass microspheres according to aspects of the present disclosure, is ranked 'excellent' in all five categories.

In some aspects, a syntactic foam, a method, and an apparatus for lightweight, tough, resilient syntactic foams with enhanced strength and resistance to swelling and corrosion are provided according to one or more of the following examples:

Example 1 is a syntactic foam having a matrix material and a plurality of microspheres embedded within the matrix material, wherein the plurality of microspheres comprise a metallic glass material.

Example 2 is the syntactic foam of claim 1, wherein the microspheres are hollow microspheres.

Example 3 is the syntactic foam of any of examples 1-2, wherein the matrix material further comprises at plurality of at least one of: carbon nanotubes, graphene-based materials, or nano-clay.

Example 4 is the syntactic foam of any of examples 1-3, wherein the metallic glass material comprises zirconium as the major chemical element.

Example 5 is the syntactic foam of any of examples 1-4, wherein the metallic glass material comprises zirconium, cobalt, and aluminum.

Example 6 is the syntactic foam of example 2, wherein each hollow microsphere of the plurality of hollow microspheres has an inner diameter and an outer diameter, wherein a ratio of the inner diameter to the outer diameter is at least 0.85.

Example 7 is The syntactic foam of example 6, wherein the outer diameter of the hollow microspheres is between about 1 micron and about 300 microns.

Example 8 is the syntactic foam of any of examples 1-7, wherein the metallic glass material comprises at least one of silver, niobium, titanium, beryllium, nickel, copper, or yttrium.

Example 9 is the syntactic foam of any of examples 1-7, wherein the metallic glass material comprises niobium and nickel.

Example 10 is the syntactic foam of any of examples 1-7, wherein the metallic glass material comprises niobium and chromium.

Example 11 is a method comprising: embedding a plurality of microspheres in a matrix material to produce a syntactic foam, wherein the plurality of microspheres comprise a metallic glass material.

Example 12 is the method of example 11, wherein the microspheres are hollow microspheres.

Example 13 is the method of any of examples 12-13, further comprising: adding at least one of carbon nanofibers, graphene-based materials, or nano-clay, to the matrix material.

Example 14 is the method of any of example 12-13, further comprising:
  producing the plurality of hollow microspheres through gas atomization.

Example 15 is the method of any of examples 11-14, wherein the metallic glass material comprises zirconium as the major chemical element.

Example 16 is the method of any of examples 12-15, wherein each hollow microsphere of the plurality of hollow microspheres has an inner diameter and an outer diameter, wherein a ratio of the inner diameter to the outer diameter is at least 0.85.

Example 17 is the method of any of examples 12-15, wherein the outer diameter of the hollow microspheres is between about 1 micron and about 300 microns.

Example 18 is an apparatus comprising a tool for use within wellbore, wherein the tool comprises a syntactic foam, the syntactic foam further comprising: a matrix material comprising a polymer material; and a plurality of hollow microspheres embedded within the matrix material, wherein the plurality of hollow microspheres comprise a metallic glass material.

Example 19 is the apparatus of example 18, wherein the tool is a drill riser buoyancy module.

Example 20 is the apparatus of any of examples 18-19 wherein the tool is a flow control device or a flowable downhole tool.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A syntactic foam for use in a flowable downhole tool, the syntactic foam comprising:
   a matrix material comprising a polymer material selected from the group consisting of polyurethane, polyamide, epoxy resin, phenolic resin, cyanate ester, polyester, vinyl ester, polyethylene, polypropylene, polystyrene, nylon, high density polyethylene, and any combination thereof and further comprising a plurality of at least one of carbon nanotubes, graphene-based materials, or nano-clay; and
   a plurality of microspheres embedded within the matrix material, wherein the plurality of microspheres comprises a metallic glass material having an amorphous structure for resisting stress-corrosion cracking in a downhole environment and comprises at least one of zirconium, cobalt, and aluminum, or at least one silver, niobium, titanium, beryllium, nickel, copper, chromium, or yttrium, the microspheres are hollow microspheres and each of the hollow microspheres have an inner diameter and an outer diameter, wherein the ratio of the inner diameter to the outer diameter is at least 0.85 and the outer diameter is between about 1 micron and about 300 microns.

2. The syntactic foam of claim 1, wherein the metallic glass material comprises zirconium as the major chemical element.

3. The syntactic foam of claim 2, wherein the metallic glass material comprises zirconium, cobalt, and aluminum.

4. The syntactic foam of claim 1, wherein the metallic glass material comprises at least one of silver, niobium, titanium, beryllium, nickel, copper, or yttrium.

5. The syntactic foam of claim 1, wherein the metallic glass material comprises niobium and nickel.

6. The syntactic foam of claim 1, wherein the metallic glass material comprises niobium and chromium.

7. A method for producing a syntactic foam for use in a flowable downhole tool comprising:
   embedding a plurality of microspheres in a matrix material comprising a polymer material selected from the group consisting of polyurethane, polyamide, epoxy resin, phenolic resin, cyanate ester, polyester, vinyl ester, polyethylene, polypropylene, polystyrene, nylon, high density polyethylene, and any combination thereof and further comprising a plurality of at least one of carbon nanotubes, graphene-based materials, or nano-clay, to produce the syntactic foam,
   wherein the plurality of microspheres comprises a metallic glass material having an amorphous structure for resisting stress-corrosion cracking in a downhole environment, and comprises at least one of zirconium, cobalt, and aluminum, or at least one silver, niobium, titanium, beryllium, nickel, copper, chromium, or yttrium, the microspheres are hollow microspheres and each of the hollow microspheres have an inner diameter and an outer diameter, wherein the ratio of the inner diameter to the outer diameter is at least 0.85 and the outer diameter is between about 1 micron and about 300 microns.

8. The method of claim 7, further comprising:
   producing the plurality of hollow microspheres through gas atomization.

9. The method of claim 7, wherein the metallic glass material comprises zirconium as the major chemical element.

10. An apparatus comprising:
    a downhole tool for use within a wellbore, wherein the tool comprises a syntactic foam, the syntactic foam further comprising:
       a matrix material comprising a polymer material selected from the group consisting of polyurethane, polyamide, epoxy resin, phenolic resin, cyanate ester, polyester, vinyl ester, polyethylene, polypropylene, polystyrene, nylon, high density polyethylene, and any combination thereof and further comprises a plurality of at least one of carbon nanotubes, graphene-based materials, or nano-clay; and
       a plurality of hollow microspheres embedded within the matrix material,
    wherein the plurality of hollow microspheres comprise a metallic glass material having an amorphous structure for resisting stress-corrosion cracking in a downhole environment and comprises at least one of zirconium, cobalt, and aluminum, or at least one silver, niobium, titanium, beryllium, nickel, copper, or yttrium, the microspheres are hollow microspheres and each of the hollow microspheres have an inner diameter and an outer diameter, wherein the ratio of the inner diameter to the outer diameter is at least 0.85 and the outer diameter is between about 1 micron and about 300 microns.

* * * * *